July 11, 1939.  H. A. BURNIP  2,165,920

PIPE JOINT

Filed March 17, 1938

Harold A. Burnip INVENTOR

BY Willard D. Eakin
ATTORNEY

Patented July 11, 1939

2,165,920

UNITED STATES PATENT OFFICE 2,165,920

PIPE JOINT

Harold A. Burnip, Cleveland, Ohio, assignor to United States Stoneware Company, Akron, Ohio, a corporation of Ohio Application March 17, 1938, Serial No. 196,307

2 Claims. (Cl. 285—194)

This invention relates to pipe joints.

When a length of pipe becomes broken or damaged in a line of bell-and-spigot pipe a difficult problem is presented in the matter of repairing the damage, because of the fact that a new length of pipe inserted has to be shorter than the old length in view of the fact that after being brought into alignment with the adjacent lengths of pipe it has to be moved in an axial direction to insert its spigot end into the adjacent bell. This makes any bell on its other end entirely useless and also means that there is necessarily a gap equal in length to the depth to which the bell and spigot are telescoped, usually about four inches in the case of medium sized sewer pipe.

This problem has been especially difficult in the case of ceramic pipe, for example, in installations requiring to be sealed at the joints against the escape of corrosive fluid, sealing gaskets of rubber usually being employed, although not wholly resistent to the action of the fluid conducted through the line.

Heretofore one practice has been to bridge the gap by means of a rubber sealing sleeve telescoped upon the two opposite pipe ends and a pair of ceramic half-sleeves clamped upon the rubber sleeve, with filler strips of rubber at the adjacent edges of the two ceramic half-sleeves and wedged inward by oblique faces of the latter to provide approximately even sealing pressure of the rubber sleeve against the pipe ends at all points around the circumference.

Thus the conduit has a rubber wall instead of a ceramic wall for the length of the gap in the ceramic line, which I have found to be highly disadvantageous because of a washing away of decomposed rubber and consequent exposure of additional rubber to the destructive action of the fluid passing through the line.

I have found also that when high clamping pressure is required for sealing the rubber sleeve to the pipe ends the two half sleeves buckle to a substantial degree even though they are of heavy construction and even though clamping bands of substantial width are employed; and that this results in, or rather is a concomitant of, the sealing pressure not being the same at all positions lengthwise of the line; and that this also affects the action of the wedged-inward filler strips which are above mentioned as being provided for giving approximately even sealing pressure circumferentially of the assembly.

The objects of this invention will be manifest from the foregoing statement of the problems involved, which I have solved in a manner which can best be described with reference to the specific embodiment of the invention which is illustrated in the accompanying drawing, of which:

Figure 1:
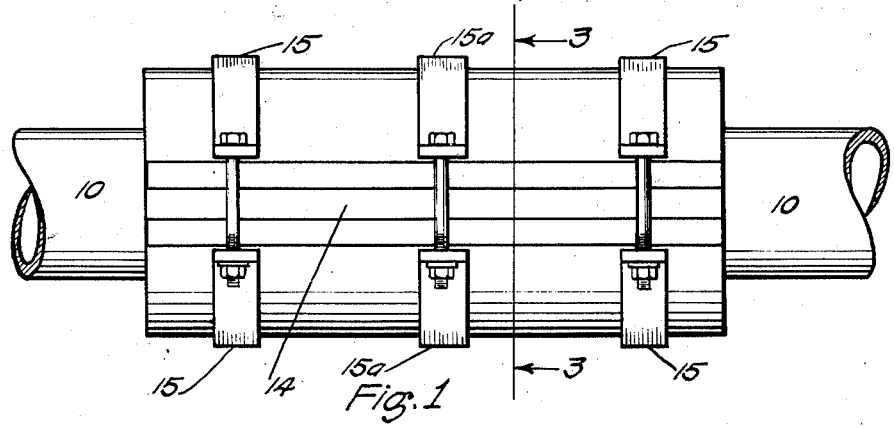
Fig. 1 is a side elevation of a pipe-joint assembly embodying and made in accordance with my invention in its preferred form.

Referring to the drawing, 10, 10 are relatively short lengths of pipe inserted in place of a broken length, or one of them can be an originally-installed length and the other a repair length. In either case, their adjacent ends are spaced apart, leaving a gap to be bridged, as above described.

Figure 2:
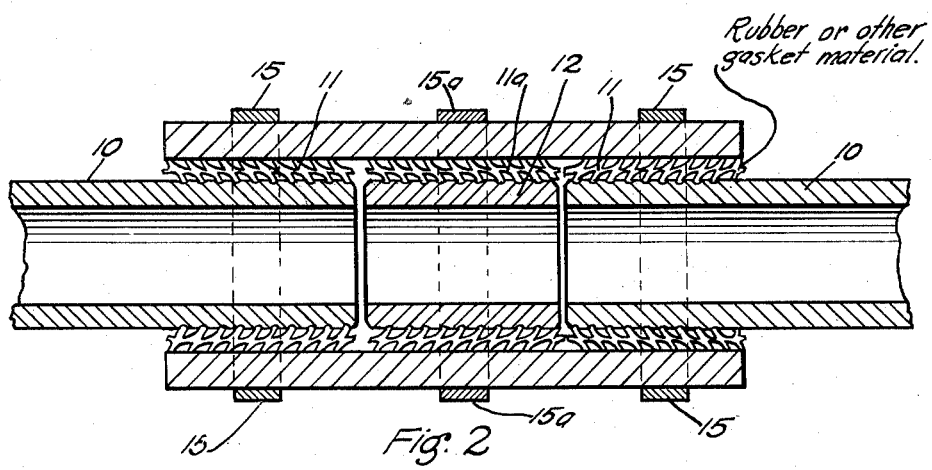
Fig. 2 is a longitudinal middle section of the same.
Figure 3:
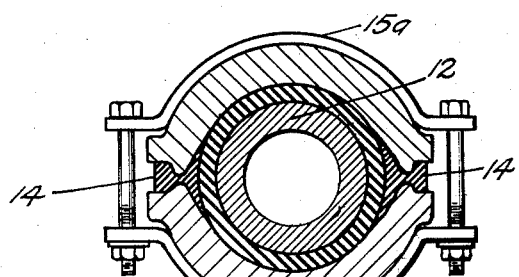
Fig. 3 is a cross-section of the same on line 3—3 of Fig. 1.

In assembling the parts to bridge this gap I first telescope upon each of the pipe ends, to at least an end-flush position, a sealing sleeve or gasket 11, which preferably is of the type described in Nathan United States Patent No. 2,032,492 with reference to Figs. 2 and 3 thereof, although I do not wholly limit my invention to the use of a flanged type of gasket or to the use of more than one gasket for the entire assembly.

I then mount a like gasket, 11ª, upon a length of pipe 12 just long enough substantially to bridge the gap but of course with sufficient clearance to permit it to be easily moved into place. The pipe section 12 with the gasket 11ª thereon is then mounted between the pipe sections 10, after which ceramic half-sleeves 13, 13 and rubber filler strips 14, 14 as above described are assembled upon the gaskets, and are clamped at three positions, by clamping bands 15, 15 overlying end portions of the pipe sections 10 and clamping bands 15ª, 15ª overlying the ceramic filler section 12.

In Fig. 2 the parts are shown as they appear before the bands are fully tightened, with substantial space between the inclined flanges of the gaskets. The bands then are further tightened, preferably until there is little or no space between the said flanges.

The ceramic pipe is here shown as being formed with circumferential corrugations, for alternative use in a poured joint, the corrugations being of little if any advantage in embodiments of the present invention.

In the assembly as described the half-sleeves can be clamped at one or more positions within the length of the gap requiring to be bridged and yet with a pipe section present for sustaining the clamping pressure locally at the clamping position.

Also, such rubber as is exposed to the conducted fluid is exposed to it only in eddy recesses of small space, so that there is very little washing-away of the rubber. For the same reason, the rubber is exposed only to substantially "dead" fluid, which soon becomes to a large degree spent as regards its chemical effect upon the rubber or such other more of less resistant material as may be used for the gaskets.

Still another advantage of the invention is that the gaskets are made more resistant by being held under greater and more uniform pressure in their regions of contact with the fluid.

The gaskets overlying the pipe sections 10 have ribs inclined in directions which can best be described as being such as to impose a pawl-like action against withdrawal of the pipe sections from the surrounding structure, this providing effective sealing as described in the above mentioned Nathan patent.

Further modifications than those above suggested are possible within the scope of the appended claims.

I claim:

1. A pipe joint comprising two aligned, spaced-apart pipe sections, means between them for sustaining transverse clamping pressure, at least two sleeve sections overlying the pressure-sustaining means and portions of the pipe sections, and means clamping the sleeve sections at positions overlying the pipe sections and at a position overlying the pressure-sustaining means.

2. A pipe joint comprising two aligned, spaced-apart pipe sections, means between them for sustaining transverse clamping pressure, at least two sleeve sections overlying the pressure-sustaining means and portions of the pipe sections, and means clamping the sleeve sections at positions overlying the pipe sections and at a position overlying the pressure-sustaining means, and fluid-sealing means effective from one of the pipe sections to the other.

HAROLD A. BURNIP.